(12) United States Patent
Quinn et al.

(10) Patent No.: US 11,659,478 B2
(45) Date of Patent: *May 23, 2023

(54) ENDPOINT COMPUTING DEVICE MULTI-NETWORK SLICE UTILIZATION SYSTEM

(71) Applicant: Dell Products L.P., Round Rock, TX (US)

(72) Inventors: Liam B. Quinn, Austin, TX (US); Anantha Boyapalle, Cedar Park, TX (US); Kamal Koshy, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/393,014

(22) Filed: Aug. 3, 2021

(65) Prior Publication Data

US 2021/0368428 A1 Nov. 25, 2021

Related U.S. Application Data

(63) Continuation of application No. 16/775,602, filed on Jan. 29, 2020, now Pat. No. 11,115,914.

(51) Int. Cl.
*H04W 48/16* (2009.01)
*H04W 48/18* (2009.01)
(Continued)

(52) U.S. Cl.
CPC ....... *H04W 48/16* (2013.01); *H04W 28/0268* (2013.01); *H04W 28/24* (2013.01);
(Continued)

(58) Field of Classification Search
CPC . H04W 48/16; H04W 28/0268; H04W 28/24; H04W 48/18; H04W 72/0486; H04W 76/15; H04W 88/06; H04W 72/52
See application file for complete search history.

(56) References Cited

U.S. PATENT DOCUMENTS 10,200,543 B2  2/2019  Senarath et al.
11,115,914 B2 * 9/2021  Quinn .................. H04W 48/16
(Continued)

FOREIGN PATENT DOCUMENTS

WO   WO 2019133049 A1   4/2019

*Primary Examiner* — Diane D Mizrahi
(74) *Attorney, Agent, or Firm* — Joseph Mencher

(57) ABSTRACT

An endpoint computing device multi-network slice utilization system includes a RAN system coupled to a core network system that allocates network slices and makes each of them available for use in wireless communications. An endpoint computing device includes applications and operates, for each of its applications, to detect that application, determine a networking connectivity requirement for that application, and identify one of the network slices that is allocated by the core network system, available via the RAN system, and that satisfies the networking connectivity requirement for that application. The endpoint computing device then establishes a connection for each of its application with the one of the network slices that satisfies the networking connectivity requirement for that application, and exchanges communications via the RAN system and the core network system for that application using the one of the network slices that satisfies the networking connectivity requirement for that application.

20 Claims, 8 Drawing Sheets

(51) Int. Cl.
*H04W 28/24* (2009.01)
*H04W 76/15* (2018.01)
*H04W 28/02* (2009.01)
*H04W 88/06* (2009.01)
*H04W 72/52* (2023.01)

(52) U.S. Cl.
CPC ........... *H04W 48/18* (2013.01); *H04W 72/52* (2023.01); *H04W 76/15* (2018.02); *H04W 88/06* (2013.01)

(56) References Cited

U.S. PATENT DOCUMENTS

2019/0288809 A1 9/2019 Iyer et al.
2020/0037146 A1 1/2020 Salkintzis

* cited by examiner

ENDPOINT COMPUTING DEVICE MULTI-NETWORK SLICE UTILIZATION SYSTEM

CROSS-REFERENCE TO RELATED APPLICATIONS

The present disclosure is a continuation of U.S. patent application Ser. No. 16/775,602, filed on Jan. 29, 2020, the disclosure of which is incorporated by reference herein in its entirety.

BACKGROUND

The present disclosure relates generally to information handling systems, and more particularly to endpoint information handling systems capable of utilizing multiple network slices.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, laptop/notebook computing devices, tablet computing devices, mobile phones, Internet of Things (IoT) computing devices, and/or other endpoint computing devices known in the art, often utilize wireless networks in order to enable mobility of those endpoint computing devices while exchanging data, as well as to exchange data from remote locations. Wireless networking technology has begun to transition from 4G millimeter wave (4G) wireless technology to 5G millimeter wave (5G) wireless technology. Current conventional 5G wireless technology includes a 5G core network system that is operated by a wireless provider (e.g., AT&T® Mobility of Atlanta, Ga., United States; SPRINT® Corporation of Overland Park, Kans., United States; VERIZON® Wireless of New York, N.Y., United States; etc.), and that operates with a 5G Radio Access Network (RAN) system that includes cellular tower systems that operate to exchange wireless communications for the endpoint computing devices discussed above.

One technique for exchanging the wireless communications by the 5G core network system for the computing devices discussed above includes the use of network slicing, which one of skill in the art will recognize is a network architecture that enables the multiplexing of virtualized and independent logical networks on the same physical network infrastructure, with each network slice providing a network (e.g., a portion of the wireless spectrum available from the 5G core network system) with a particular networking characteristics via the 5G RAN to any of the endpoint computing devices. The 5G specification defines network slicing to enable the scaling of the 5G core network system infrastructure to computing devices having particular connectivity metrics, and tends to work well for "single-function" computing devices such as the IoT computing devices (e.g., IoT power meter devices) discussed above, autonomous driving computing device, factory automation computing devices, and/or other single-function endpoint computing devices known in the art.

For example, such single-function endpoint computing devices tend to require a particular networking connectivity requirement (e.g., a low bandwidth, low latency networking connectivity requirement for an IoT power meter device) for their provided functionality, and thus a network slice may be allocated at the 5G core network system and provided via the 5G RAN system to single-function endpoint computing devices with networking connectivity requirements that may be satisfied by the networking characteristics of that network slice. However, general purpose endpoint computing devices such as the laptop/notebook computing devices, tablet computing devices, and mobile phones discussed above provide multiple functions (e.g., via multiple applications or workloads operating on those general purpose endpoint computing devices), and thus the conventional provisioning of a network slice with particular networking characteristics that satisfy a particular networking connectivity requirement to such general purpose endpoint computing devices will often result in a networking connection that is non-optimal for at least some of the functionality provided by the general purpose endpoint computing device (e.g., at least some of the applications or workloads operating on the general purpose endpoint computing device.)

Accordingly, it would be desirable to provide an endpoint computing device network slice utilization system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a network slice engine that is configured, for each of a plurality of applications, to: detect that application; determine a networking connectivity requirement for that application; identify one of a plurality of network slices that is allocated by a core network system, available via a Radio Access Network (RAN) system, and that satisfies the networking connectivity requirement for that application; establish a connection for that application with the one of the plurality of network slices that satisfies the networking connectivity requirement for that application; and exchange communications via the RAN system and the core network system for that application using the one of the plurality of network slices that satisfies the networking connectivity requirement for that application.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
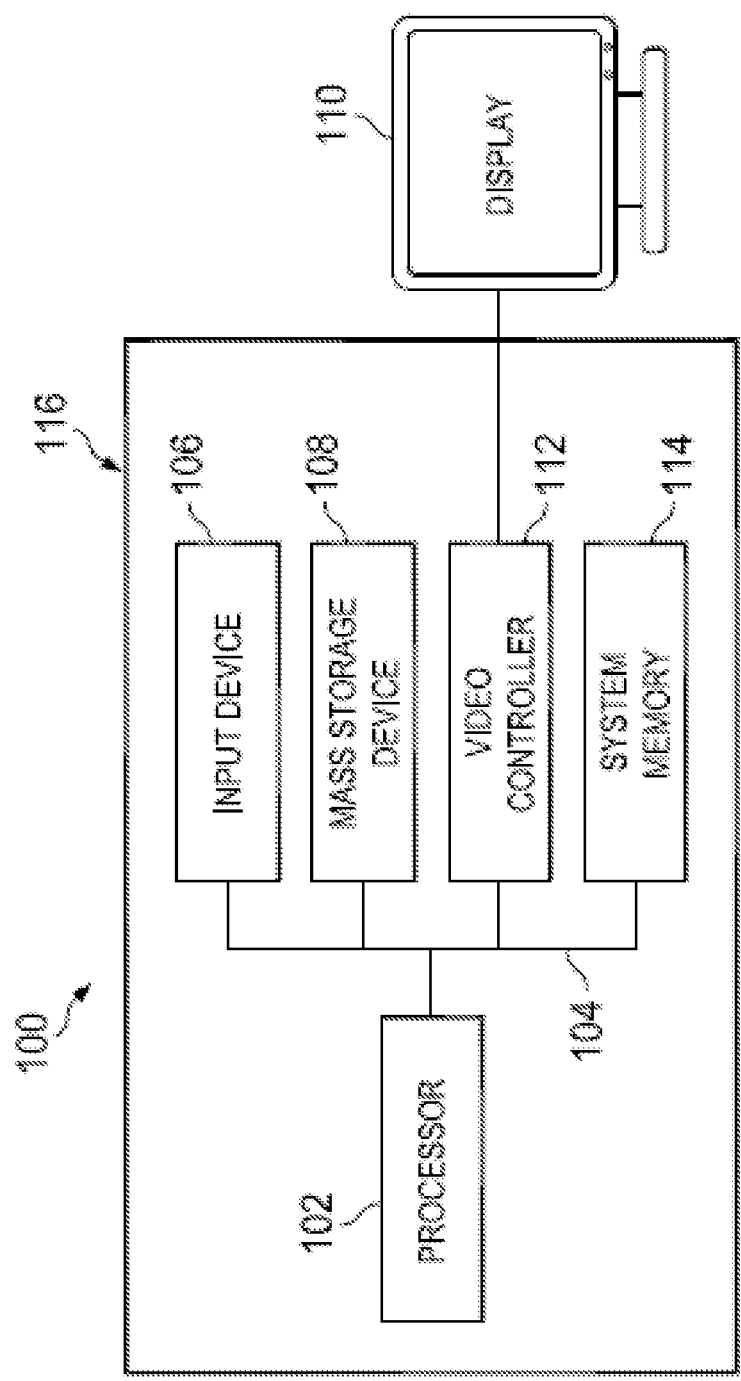
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
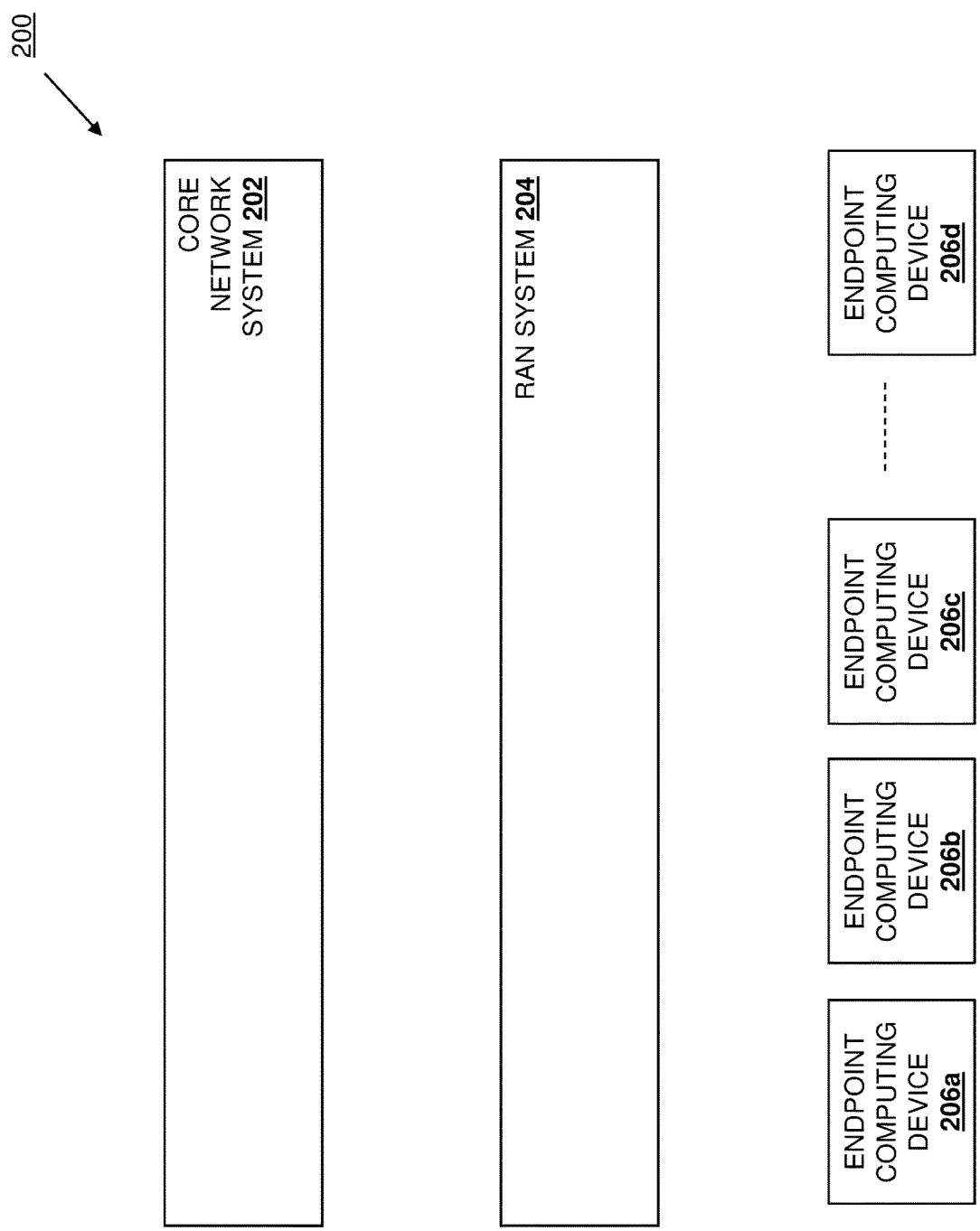
FIG. 2 is a schematic view illustrating an embodiment of an endpoint computing device multi-network slice utilization system.

Referring now to FIG. 2, an embodiment of an endpoint computing device multi-network slice utilization system 200 is illustrated. In the illustrated embodiment, the endpoint computing device multi-network slice utilization system 200 includes a core network system 202. In an embodiment, the core network system 202 may be provided by the IHS 100 discussed above with reference to FIG. 1, and/or may include some or all of the components of the IHS 100, and in specific examples may include server devices, switch devices, storage devices, and/or other core network system components connected together to provide a 5G core network system that may be operated by a wireless provider (e.g., AT&T® Mobility of Atlanta, Ga., United States; SPRINT® Corporation of Overland Park, Kans., United States; VERIZON® Wireless of New York, N.Y., United States; etc.) and may include any combination of physical and/or virtual components that are configured to provide 5G wireless communications. However, while illustrated and discussed as physical and/or virtual components that provide 5G wireless communications, one of skill in the art in possession of the present disclosure will recognize that other components and/or component configurations may be utilized in a core network system to provide other wireless communications capabilities (e.g., 4G wireless communications) while remaining within the scope of the present disclosure as well.

In the illustrated embodiment, the endpoint computing device multi-network slice utilization system 200 also includes a Radio Access Network (RAN) system 204. In an embodiment, the RAN system 204 may be provided by the IHS 100 discussed above with reference to FIG. 1, and/or may include some or all of the components of the IHS 100, and may include radio/cellular towers, base stations, antennas, core network interface devices, and/or any other RAN subsystems that would be apparent to one of skill in the art in possession of the present disclosure. In a specific example, the RAN system 204 may be a 5G RAN system including cellular towers that are configured to provide for wireless communications by endpoint computing devices utilizing network slices/spectrum allocated by the 5G core network system discussed above. For example, the RAN system 204 may provide an orchestration layer for wireless communications between communication devices and cellular towers, allowing wireless communications to then be exchanged by a RAN controller in the RAN system 204 via a Software Defined Networking (SDN) switch device and a separate control-based interface, the separation of which allows the RAN system 204 to be flexible and accommodate Network Function Virtualization (NFV) techniques utilized in 5G communications.

Furthermore, the endpoint computing device multi-network slice utilization system 200 also include a plurality of endpoint computing devices 206a, 206b, 206c, and up to 206d, each of which may be provided by the IHS 100 discussed above with reference to FIG. 1, and/or may include some or all of the components of the IHS 100. In a specific example, the endpoint computing devices 206a-206d may be provided by mobile phones, tablet computing devices, laptop/notebook computing devices, IoT computing devices, and/or any other endpoint computing devices that would be apparent to one of skill in the art in possession of the present disclosure. However, while a specific endpoint computing device multi-network slice utilization system 200 has been illustrated and described, one of skill in the art in possession of the present disclosure will recognize that the endpoint computing device multi-network slice utilization system of the present disclosure may include a variety of components and component configurations while remaining within the scope of the present disclosure as well.

Figure 3:
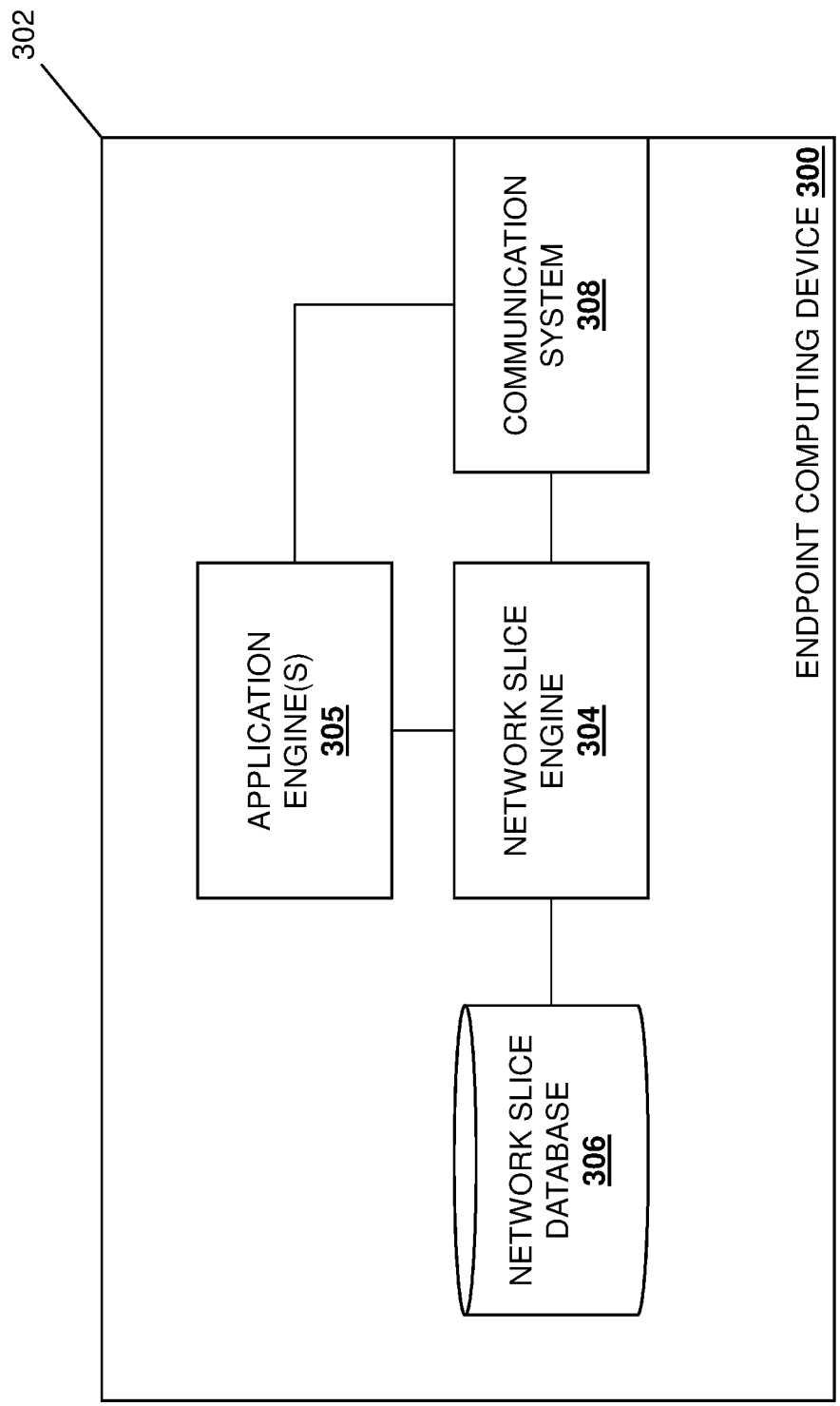
FIG. 3 is a schematic view illustrating an embodiment of an endpoint computing device that may be provided in the endpoint computing device multi-network slice utilization system of FIG. 2.

Referring now to FIG. 3, an embodiment of an endpoint computing device 300 is illustrated that may provide any or all of the endpoint computing devices 206a-206d discussed above with reference to FIG. 2. As such, the endpoint computing device 300 may be provided by the IHS 100 discussed above with reference to FIG. 1 and/or may include some or all of the components of the IHS 100, and in specific examples may be provided by mobile phones, tablet computing devices, laptop/notebook computing devices, IoT computing devices, and/or any other endpoint computing devices that would be apparent to one of skill in the art in possession of the present disclosure. Furthermore, while illustrated and discussed as an endpoint computing device 300, one of skill in the art in possession of the present disclosure will recognize that the functionality of the endpoint computing device 300 discussed below may be provided by other devices that are configured to operate similarly as the endpoint computing device 300 discussed below.

In the illustrated embodiment, the endpoint computing device 300 includes a chassis 302 that houses the components of the endpoint computing device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a network slice engine 304 that is configured to perform the functionality of the network slice engines and/or computing devices discussed below. Furthermore, the memory system may also include instructions that, when executed by the processing system, cause the processing system to provide an application engine 305 that is configured to provide any or all of the applications discussed below as operating on the endpoint computing device 300.

The chassis 302 may also house a storage system (not illustrated, but which may include the storage 108 discussed above with reference to FIG. 1) that is coupled to the network slice engine 304 (e.g., via a coupling between the storage system and the processing system) and that includes a network slice database 306 that is configured to store any of the information utilized by the network slice engine 304 discussed below. The chassis 302 may also house a communication system 308 that is coupled to the network slice engine 304 and the application engine 305 (e.g., via a coupling between the communication system 308 and the processing system) and that may be provided by a Network Interface Controller (NIC), wireless communication systems (e.g., cellular wireless components (e.g., 5G cellular wireless components), BLUETOOTH® components, Near Field Communication (NFC) components, WiFi components, etc.), and/or any other communication components that would be apparent to one of skill in the art in possession of the present disclosure. However, while a specific endpoint computing device 300 has been illustrated, one of skill in the art in possession of the present disclosure will recognize that endpoint computing devices (or other devices operating according to the teachings of the present disclosure in a manner similar to that described below for the endpoint computing device 300) may include a variety of components and/or component configurations for providing conventional endpoint computing device functionality, as well as the functionality discussed below, while remaining within the scope of the present disclosure as well.

Figure 4:
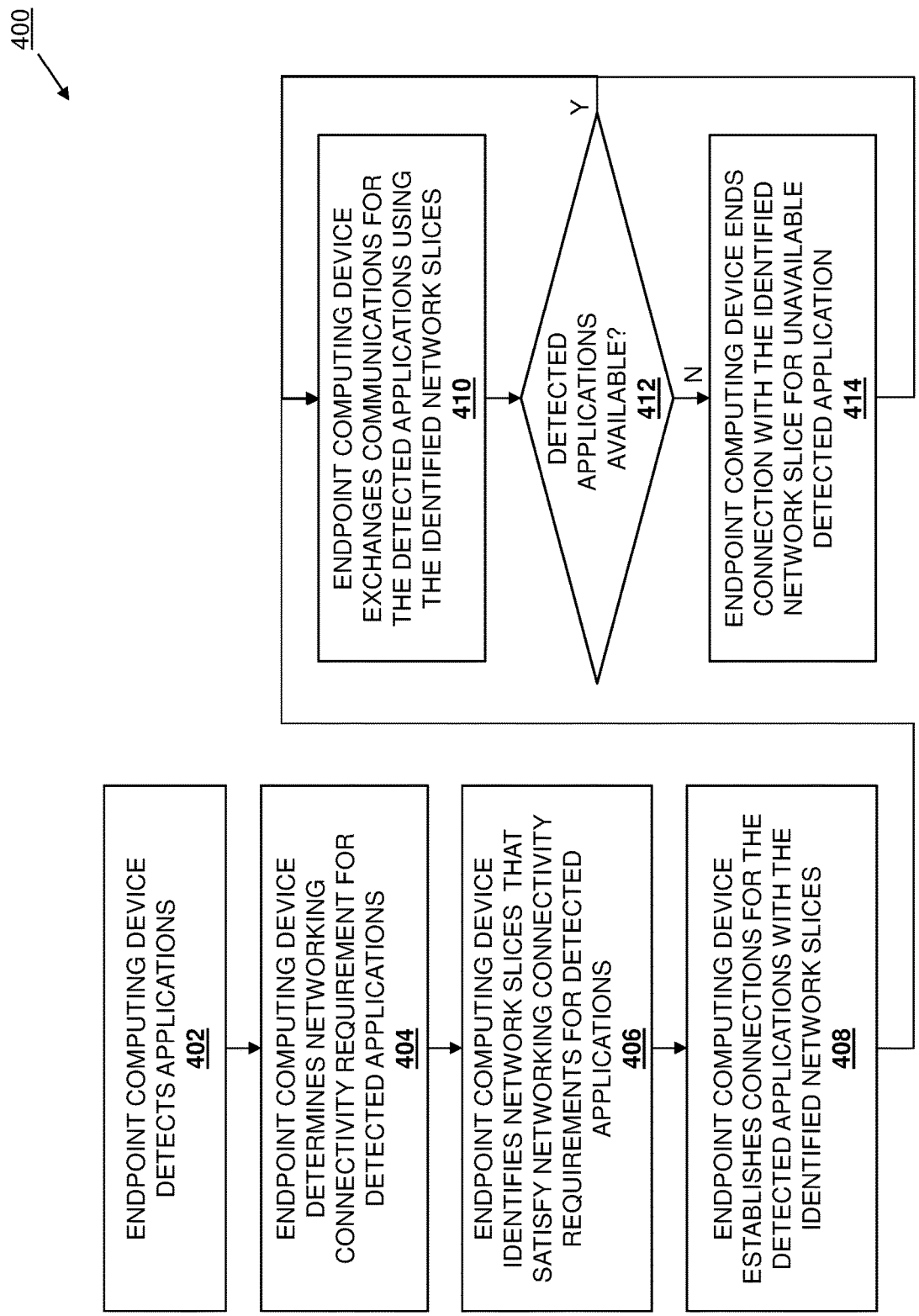
FIG. 4 is a flow chart illustrating an embodiment of a method for utilizing multiple network slices by an endpoint computing device.

Referring now to FIG. 4, an embodiment of a method 400 for utilizing multiple network slices for an endpoint computing device is illustrated. As discussed below, the systems and methods of the present disclosure provide for the utilization of respective network slices for different functionality (e.g., different applications, different workloads, etc.) provided on any particular endpoint computing device. For example, a core network system that is coupled to a RAN system may allocate a plurality of network slices and make each of the plurality of network slices available for use in wireless communications via the RAN system. An endpoint computing device may include first and second applications that are configured to operate on the endpoint computing device, and the endpoint computing device may detect each of the first application and the second application, determine a first networking connectivity requirement for the first application, and determine a second networking connectivity requirement for the second application. The endpoint computing device may then identify a first network slice that is allocated by the core network system, available via the RAN system, and that satisfies the first networking connectivity requirement for the first application. The endpoint computing device may also identify a second network slice that is allocated by the core network system, available via the RAN system, and that satisfies the second networking connectivity requirement for the second application. Then endpoint computing device then establishes a first connection for the first application with the first network slice, and establishes a second connection for the second application with the second network slice. Subsequently, the first application may exchange first communications via the RAN system and the core network system using the first network slice, and the second application may exchange second communications via the RAN system and the core network system using the second network slice. As such, network slicing is extended to general purpose endpoint computing devices running applications (or workloads) with different networking connectivity requirements by providing for the utilization of a respective network slice by each of those applications, thus optimizing the networking connectivity of the general purpose endpoint computing device on a per-application/per-workload/per functionality basis.

Figure 5:
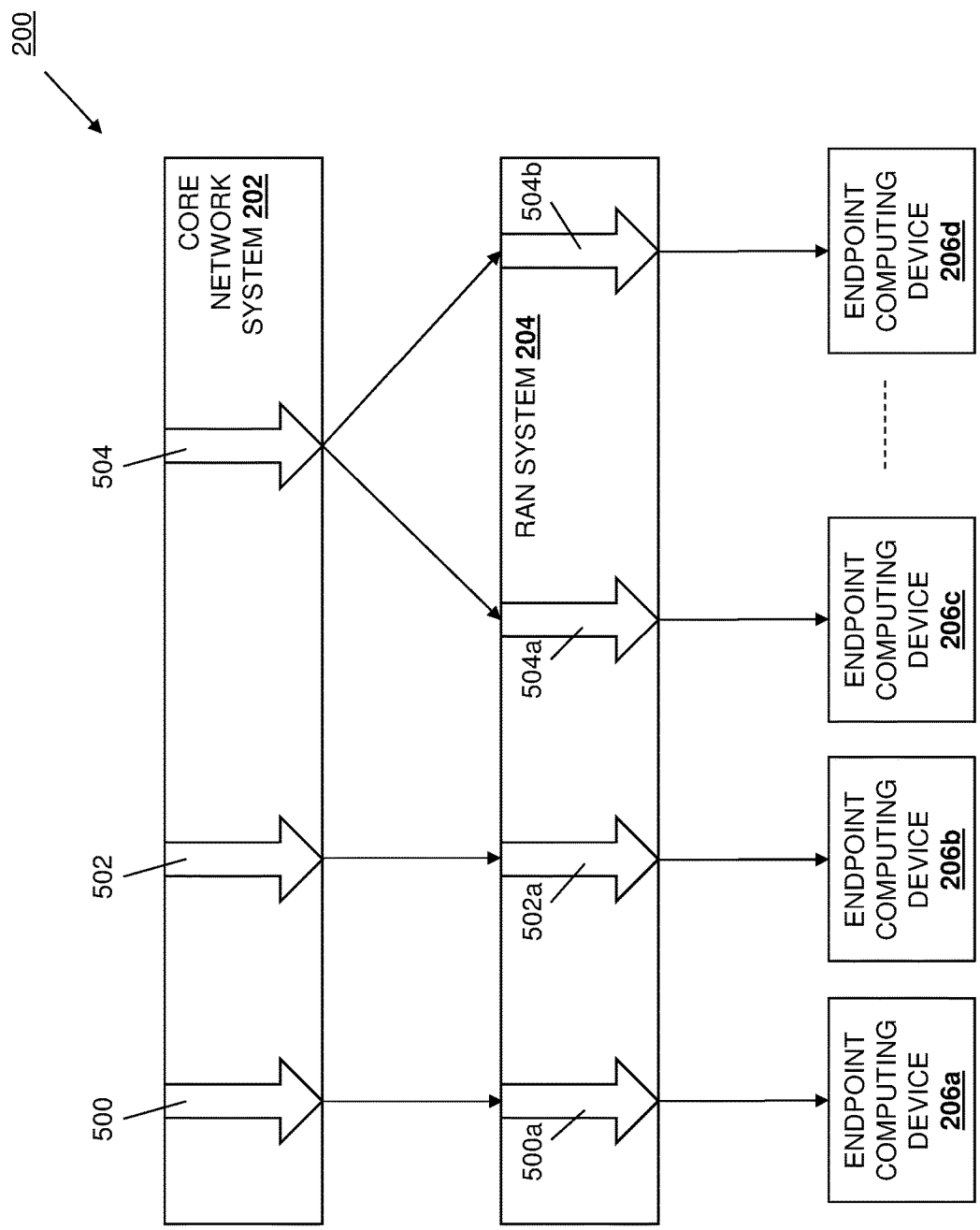
FIG. 5 is a schematic view illustrating an embodiment of a conventional endpoint computing device network slice utilization system.

With reference to FIG. 5, an embodiment of conventional endpoint computing device network slicing functionality using the endpoint computing device multi-network slice utilization system 200 of FIG. 2 is illustrated for purposes of discussion and to contrast the endpoint computing device multi-network slice functionality of the present disclosure. As illustrated in FIG. 5, the core network system 202 (e.g., a 5G core network system) may operate to allocate network slices and make those network slices available to via the RAN system 204 (e.g., a 5G RAN system) for use in wireless communications. For example, arrows are provided within the core network system 202 in FIG. 5 to represent portions of spectrum that are available to the core network system 202, including a spectrum portion 500, a spectrum portion 502, and a spectrum portion 504 in the illustrated embodiment.

Furthermore, the allocation of network slices and the making of those network slices available via the RAN system 204 for use in wireless communications by the core network system 202 is illustrated in FIG. 5 by arrows provided in the RAN system 204, and may include the core network system 202 allocating a network slice 500a from the spectrum portion 500 (as illustrated by the arrow between the spectrum portion 500 and the network slice 500a), allocating a network slice 502a from the spectrum portion 502 (as illustrated by the arrow between the spectrum portion 502 and the network slice 502a), and allocating network slices 504a and 504b from the spectrum portion 504 (as illustrated by the respective arrow between the spectrum portion 504 and the network slices 504a and 504b). One of skill in the art in possession of the present disclosure would recognize that the allocation of network slices by a core network system, and the making of those network slices available by the core network system via a RAN system, may include a variety of conventional operations, and thus is not described herein in detail. Furthermore, one of skill in the art in possession of the present disclosure will appreciate that each network slice 500a, 502a, 504a, and 504b may provide particular networking characteristics including particular data transmission latency, particular data transmission throughput/bandwidth, particular data transmission reliability, other particular Quality of Service (QoS) characteristics, and/or other particular networking characteristics that would be apparent to one of skill in the art in possession of the present disclosure.

As also illustrated in FIG. 5, each of the endpoint computing devices 206a-206d may then operate to connect to a respective network slice in order to utilize that network slice for exchanging wireless communications via the RAN system 204 and the core network system 202 (i.e., wireless communications with other endpoint computing devices coupled to the RAN system 204, other endpoint devices coupled to a network that is coupled to the core network system 202, etc.) One of skill in the art in possession of the present disclosure would recognize that the connection to a network slice by an endpoint computing device, and the exchange of communications via a RAN system and core network system by that endpoint computing device using that network slice, may include a variety of conventional operations, and thus is not described herein in detail. As discussed above, the conventional endpoint computing device network slicing illustrated in FIG. 5 and described above tends to work well for "single-function" computing devices such as IoT computing devices (e.g., IoT power meter devices), autonomous driving computing device, factory automation computing devices, and/or other single-function endpoint computing devices known in the art that include particular networking connectivity requirements, as the networking characteristics of a single network slice to which an endpoint computing device conventionally connects do not substantially change during the networking session associated with that connection.

However, the conventional endpoint computing device network slicing illustrated in FIG. 5 and described above introduces inefficiencies when utilized with general purpose endpoint computing devices such as laptop/notebook computing devices, tablet computing devices, and mobile phones that provide multiple functions (e.g., via multiple applications operating on those general purpose endpoint computing devices), as the conventional provisioning of a conventional network slice with networking characteristics that satisfy a particular networking connectivity requirement to such general purpose endpoint computing devices will often result in a networking connection that is non-optimal for at least some of the functionality provided by the general purpose endpoint computing device (e.g., at least some of the applications or workloads operating on the general purpose endpoint computing device.) As described below, the endpoint computing device multi-network slice utilization systems and methods of the present disclosure remedy such inefficiencies by allowing multiple separate endpoint computing device functionalities provided by a single endpoint computing device (e.g., applications, workloads, etc.) to each connect to and utilize a respective network slice that includes networking characteristics that satisfy the networking connectivity requirements of that endpoint computing device functionality.

The method 400 begins at block 402 where an endpoint computing device detects applications. In the specific example provided below, the method 400 is described as being performed by the endpoint computing device 206a. However, one of skill in the art in possession of the present disclosure will appreciate that the method 400 may be performed by any or all of the endpoint computing devices 206a-206d at the same (or different) times while remaining within the scope of the present disclosure as well. In an embodiment, at block 402, the application engine(s) 305 in the endpoint computing device 206a/300 may operate to provide one or more applications for operation on the endpoint computing device 206a/300. For example, at block 402, the application engine(s) 305 in the endpoint computing device 206a/300 may operate to provide a video communication application, an audio communication application, a video streaming application, an office productivity application, a gaming application, and/or any other applications that would be apparent to one of skill in the art in possession of the present disclosure. As would be appreciated by one of skill in the art in possession of the present disclosure, the applications provided at block 402 may operate to provide (or be replaced by) workloads operating on the endpoint computing device(s), as well as any other endpoint computing device functionality that one of skill in the art in possession of the present disclosure would recognize that benefitting from the dedicated network slices functionality described below.

As such, in an embodiment of block 402, the network slice engine 304 in the endpoint computing device 206a/300 may operate to detect the applications provided by the application engine(s) 305. For example, at block 402, the network slice engine 304 in the endpoint computing device 206a/300 may detect the applications provided by the application engine(s) 305 and operating on the endpoint computing device 206a/300 in response to the launching of those applications, in response to respective network connection requests received from those applications, and/or in response to any other application detection event that would be apparent to one of skill in the art in possession of the present disclosure. As such, continuing with the specific example provided above, at block 402, the network slice engine 304 in the endpoint computing device 206a/300 may detect a video communication application, an audio communication application, a video streaming application, an office productivity application, and/or a gaming application provided on the endpoint computing device 206a/300. However, while the method 400 is described as detecting applications at block 402, one of skill in the art in possession of the present disclosure will appreciate how workloads and/or other functionality provided on the endpoint computing device 206a/300 may be detected at block 402 while remaining within the scope of the present disclosure as well.

The method 400 then proceeds to block 404 where the endpoint computing device determines networking connectivity requirements for the detected applications. In an embodiment, at block 404, the network slice engine 304 in the endpoint computing device 206a/300 may operate to determine a networking connectivity requirement for each of the applications detected at block 402. In an embodiment, the determination of the networking connectivity requirements for an application by the network slice engine 304 in the endpoint computing device 206a/300 may include the application engine 305, which is providing an application, transmitting the networking connectivity requirements for that application to the network slice engine 304 (e.g., as IP header information in a data packet); the network slice engine 304 retrieving the networking connectivity requirements for an application (e.g., in response to the detection of that application) that may have been previously determined and stored in the network slice database 306 from the network slice database 306; and/or via any other networking connectivity requirement determination technique that would be apparent to one of skill in the art in possession of the present disclosure.

Continuing with the specific example provided above, at block 404, the network slice engine 304 in the endpoint computing device 206a/300 may operate to determine networking connectivity requirements for a video communication application detected at block 402 that includes a relatively high bandwidth networking connectivity requirement, a relatively low latency networking connectivity requirement, and a relatively high reliability networking connectivity requirement. Similarly, at block 404, the network slice engine 304 in the endpoint computing device 206a/300 may operate to determine networking connectivity requirements for an audio communication application detected at block 402 that includes a relatively low bandwidth networking connectivity requirement, a relatively low latency networking connectivity requirement, and a relatively high reliability networking connectivity requirements. Similarly, at block 404, the network slice engine 304 in the endpoint computing device 206a/300 may operate to determine networking connectivity requirements for a video streaming application detected at block 402 that includes a relatively high bandwidth networking connectivity requirement, a relatively intermediate latency networking connectivity requirement, and a relatively intermediate reliability networking connectivity requirement.

Similarly, at block 404, the network slice engine 304 in the endpoint computing device 206a/300 may operate to determine networking connectivity requirements for an office productivity application detected at block 402 that includes a relatively intermediate bandwidth networking connectivity requirement, a relatively low latency networking connectivity requirement, and a relatively low reliability networking connectivity requirements. Similarly, at block 404, the network slice engine 304 in the endpoint computing device 206a/300 may operate to determine networking connectivity requirements for a gaming application detected at block 402 that includes a relatively very high bandwidth networking connectivity requirement, a relatively very high latency networking connectivity requirement, and a relatively very high reliability networking connectivity requirement. However, while a few specific examples are provided, one of skill in the art in possession of the present disclosure will appreciate how different applications, workloads, and/or functionalities operating on and/or provided by an endpoint computing devices may include a variety of different networking connectivity requirements, and that any of those networking connectivity requirements may be determined at block 404 while remaining within the scope of the present disclosure as well.

Furthermore, in different embodiments, any particular application, workload, and/or functionality operating on the endpoint computing device 206a/300 may include multiple application subsystems, workload subsystems, and/or functionality subsystems that have different networking connectivity requirements (e.g., an application operating on the endpoint computing device 206a/300 may include a first application subsystem having a first networking connectivity requirement, a second application subsystem having a second networking connectivity requirement, and so on), and those applications subsystems, workload subsystems, and/or functionality subsystems may be detected at block 402 and their different networking connectivity requirements determined at block 404. Further still, in some embodiments, multiple applications operating on the endpoint computing device 206a/300 may include the same networking connectivity requirement (or respective networking connectivity requirements that fall within a particular networking connectivity requirement range) and, as such, those applications may be detected, the networking connectivity requirements of those applications may be determined, and those applications may be grouped in an application container that is associated with networking connectivity requirement (or networking connectivity requirement range) of those applications. Yet, further still, while the grouping of applications with the same or similar networking connectivity requirements into an application container is described as being performed during the method 400, the application containers discussed above as being associated with an networking connectivity requirement or networking connectivity requirement range may be determined prior to the method 400, stored in the network slice database 306, and identified at block 404 from that network slice database 306 while remaining within the scope of the present disclosure as well.

Figure 6A:
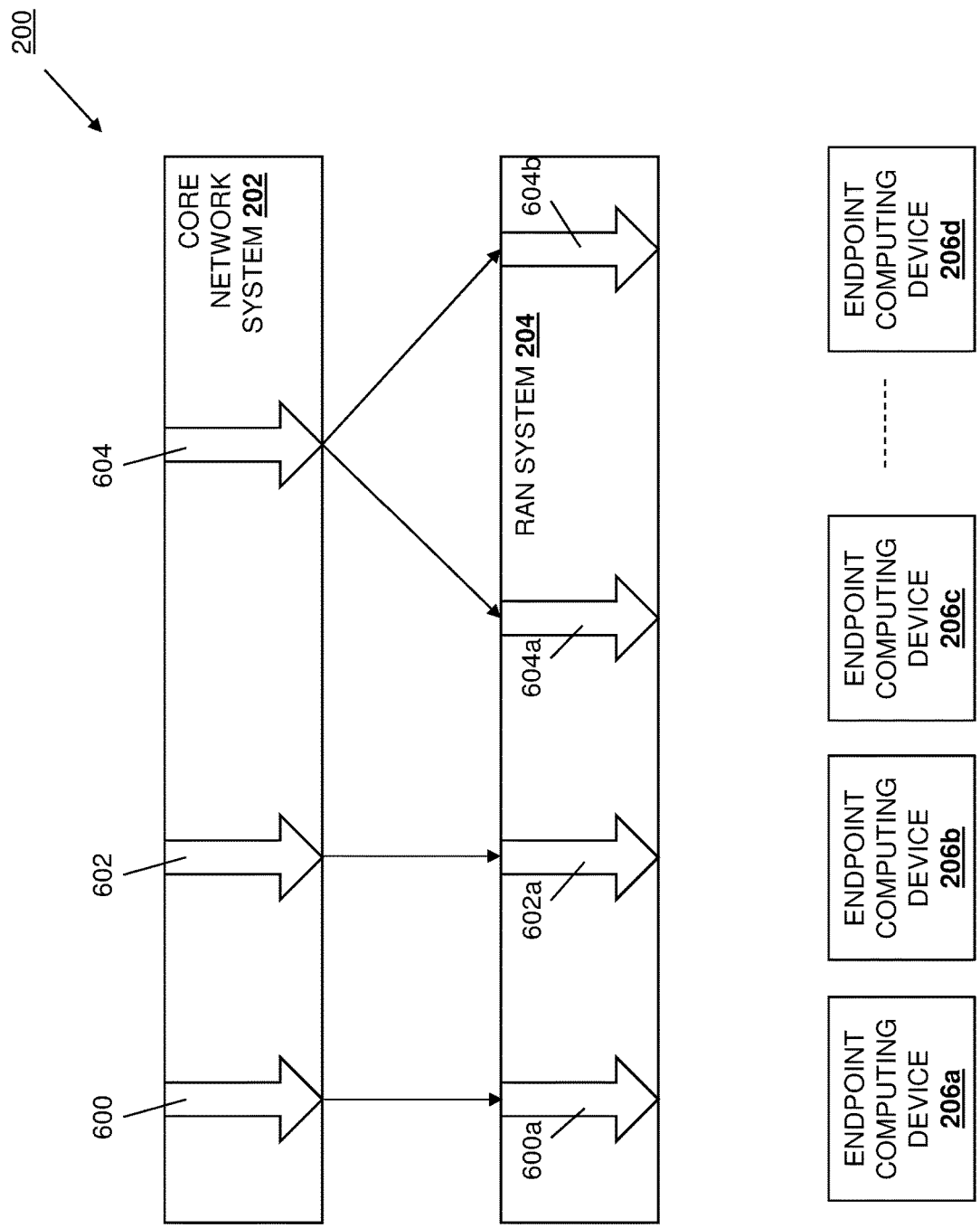
FIG. 6A is a schematic view illustrating an embodiment of the endpoint computing device multi-network slice utilization system of FIG. 2 operating during the method of FIG. 4.

The method 400 then proceeds to block 406 where the endpoint computing device identifies network slices that satisfy the networking connectivity requirements for the detected applications. In an embodiment, at block 406, the network slice engine 304 in the endpoint computing device 206a/300 may operate to identify a respective network slice that satisfies each networking connectivity requirement determined for each of the applications at block 404. With reference to FIG. 6A, the core network system 202 (e.g., a 5G core network system) may operate to allocate network slices and make those network slices available to via the RAN system 204 (e.g., a 5G RAN system) for use in wireless communications. For example, arrows are provided in the core network system 202 in FIG. 6A to represent portions of spectrum that is available to the core network system 202, including a spectrum portion 600, a spectrum portion 602, and a spectrum portion 604 in the illustrated embodiment.

Furthermore, the allocation of network slices and the making of those network slices available via the RAN system 204 for use in wireless communications by the core network system 202 is illustrated in FIG. 6A by arrows provided in the RAN system 204, and may include the core network system 202 allocating a network slice 600a from the spectrum portion 600 (as illustrated by the arrow between the spectrum portion 600 and the network slice 600a), allocating a network slice 602a from the spectrum portion 602 (as illustrated by the arrow between the spectrum portion 602 and the network slice 602a), and allocating network slices 604a and 604b from the spectrum portion 604 (as illustrated by the respective arrow between the spectrum portion 604 and the network slices 604a and 604b). One of skill in the art in possession of the present disclosure would recognize that the allocation of network slices by a core network system, and the making of those network slices available by the core network system via a RAN system, may include a variety of conventional operations, and thus is not described herein in detail. Furthermore, one of skill in the art in possession of the present disclosure will appreciate that each network slice 600a, 602a, 604a, and 604b may provide particular networking characteristics including particular data transmission latency, particular data transmission throughput/bandwidth, particular data transmission reliability, other particular QoS networking characteristics, and/or other particular networking characteristics that would be apparent to one of skill in the art in possession of the present disclosure.

Figure 6B:
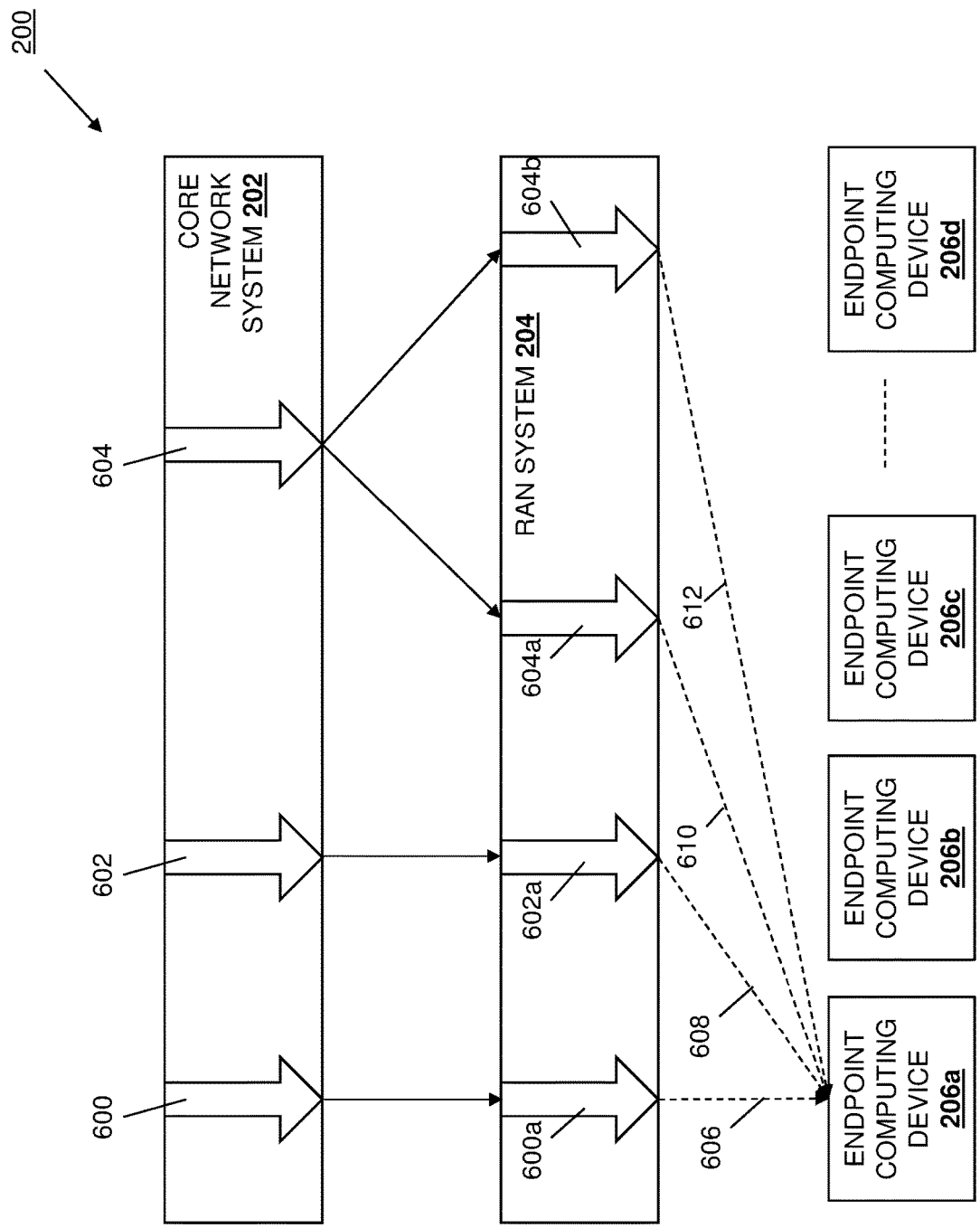
FIG. 6B is a schematic view illustrating an embodiment of the endpoint computing device multi-network slice utilization system of FIG. 2 operating during the method of FIG. 4.

In some embodiments, each network slice allocated by the core system network system 202 and made available via the RAN system 204 by the core network system 202 may be configured to identify the particular networking characteristics provided by that network slice. For example, each of the network slices 500a, 502a, 504a, and 504b may be configured to advertise its networking characteristics such that the network slice engine 304 in the endpoint computing device 206a/300 may identify the networking characteristics of each network slice that is available for connection to the endpoint computing device 206a/300. FIG. 6B illustrates how the network slice 600a may advertise its networking characteristics 606 to the endpoint computing device 206a (illustrated via a dashed arrow in FIG. 6B), the network slice 602a may advertise its networking characteristics 608 to the endpoint computing device 206a (illustrated via a dashed arrow in FIG. 6B), the network slice 604a may advertise its networking characteristics 610 to the endpoint computing device 206a (illustrated via a dashed arrow in FIG. 6B), and the network slice 604b may advertise its networking characteristics 610 to the endpoint computing device 206a (illustrated via a dashed arrow in FIG. 6B). One of skill in the art in possession of the present disclosure will appreciate that the dashed arrows in FIG. 6B may indicate the retrieval of the networking characteristics 606, 608, 610, and 612 by the network slice engine 304 in the endpoint computing device 206a/300 via the network slice advertisements discussed above. In a specific example, any particular network slice may identify its networking characteristics via a network slice identifier, a network slice name, a network slice data traffic QoS (e.g., default/best effort, video streaming best effort, enterprise high priority, etc.), and/or a code (e.g., 0x00, 0x1A, 0X12, etc.).

As such, at block 406, the network slice engine 304 in the endpoint computing device 206a/300 may identify the latency networking characteristics, the throughput/bandwidth networking characteristics, the reliability networking characteristics, other QoS networking characteristics, and/or any other networking characteristics provided by each of the network slices 600a, 602a, 604a, and 604b. Furthermore, while a particular technique for identifying networking characteristics of a network slice have been described, one of skill in the art in possession of the present disclosure will appreciate that other techniques for identifying networking characteristics of a network slice may fall within the scope of the present disclosure as well. In a specific example, a RAN controller in the RAN system 204 may inform the endpoint computing device about the number of network slices available to that endpoint computing device from the RAN system, and the QoS networking characteristics associated with each network slice, which allows the endpoint computing device to associate the data traffic provided by each application or workload operating on that endpoint computing device with a network slice that satisfies its network connectivity requirements, as discussed below.

Thus, at block 406, the network slice engine 304 in the endpoint computing device 206a/300 may identify a respective one of the network slices 206a-206d that includes networking characteristics that satisfy the networking connectivity requirements of each of the applications detected at block 402. Continuing with the example provided above, at block 406 the network slice engine 304 in the endpoint computing device 206a/300 may identify a network slice that includes networking characteristics that satisfy the networking connectivity requirements for a video communication application detected at block 402 that includes a relatively high bandwidth networking connectivity requirement, a relatively low latency networking connectivity requirement, and a relatively high reliability networking connectivity requirement. Similarly, at block 406 the network slice engine 304 in the endpoint computing device 206a/300 may identify a network slice that includes networking characteristics that satisfy networking connectivity requirements for an audio communication application detected at block 402 that includes a relatively low bandwidth networking connectivity requirement, a relatively low latency networking connectivity requirement, and a relatively high reliability networking connectivity requirements. Similarly, at block 406 the network slice engine 304 in the endpoint computing device 206a/300 may identify a network slice that includes networking characteristics that satisfy determine networking connectivity requirements for a video streaming application detected at block 402 that includes a relatively high bandwidth networking connectivity requirement, a relatively intermediate latency networking connectivity requirement, and a relatively intermediate reliability networking connectivity requirement.

Similarly, at block 406 the network slice engine 304 in the endpoint computing device 206a/300 may identify a network slice that includes networking characteristics that satisfy networking connectivity requirements for an office productivity application detected at block 402 that includes a relatively intermediate bandwidth networking connectivity requirement, a relatively low latency networking connectivity requirement, and a relatively low reliability networking connectivity requirements. Similarly, at block 406 the network slice engine 304 in the endpoint computing device 206a/300 may identify a network slice that includes networking characteristics that satisfy networking connectivity requirements for a gaming application detected at block 402 that includes a relatively very high bandwidth networking connectivity requirement, a relatively very high latency networking connectivity requirement, and a relatively very high reliability networking connectivity requirement.

Furthermore, in some embodiments, at block 406 the network slice engine 304 in the endpoint computing device 206a/300 may identify respective network slices that include respective networking characteristics that satisfy different networking connectivity requirements for respective multiple application subsystems, workload subsystems, and/or functionality subsystems included in an application, workload, or functionality (e.g., a first network slice including first networking characteristics that satisfy a first networking connectivity requirement for a first application subsystem included in an application operating on the endpoint computing device 206a/300, a second network slice including second networking characteristics that satisfy a second networking connectivity requirement for a second application subsystem included in that application operating on the endpoint computing device 206a/300, and so on). Further still, in some embodiments, at block 406 the network slice engine 304 in the endpoint computing device 206a/300 may identify a network slice that includes networking characteristics that satisfy the same networking connectivity requirement (or a networking connectivity requirement range) for multiple applications that have been grouped in an application container as discussed above.

As will be appreciated by one of skill in the art in possession of the present disclosure, the identification of respective network slices that include networking characteristics that satisfy the networking connectivity requirements of each application operating on the endpoint computing device 206a/300 may include, for each application with a particular networking connectivity requirement, the identification of a network slice that includes networking characteristics that are closest to those networking connectivity requirements, that fall within some range of those networking connectivity requirements, and/or that one of skill in the art in possession of the present disclosure would recognize make that network slice the most desirable of the network slices that are available to the endpoint computing device 206a/300 for providing that connection for that application. Furthermore, one of skill in the art in possession of the present disclosure will appreciate that situations may arise in which no network slices are available that include networking characteristics that satisfy the network connectivity requirements of an application and, in such situations, the network slice that includes networking characteristics that most closely satisfy the network connectivity requirements of that application may be identified for providing the connection for that application.

In some embodiments, the network slice engine 304 in the endpoint computing device 206a/300 may be configured to request network slices with particular networking characteristics that satisfy the networking connectivity requirements of applications detected to block 402. For example, after determining the networking connectivity requirements for an application at block 404, the network slice engine 304 in the endpoint computing device 206a/300 may transmit a network slice request communication via the RAN system 204 to the core network system 202 (e.g., via an available connection to the core network system 202 that may have been previously established using conventional techniques and/or the techniques described herein), with that network slice request communication providing a request to allocate a network slice having networking characteristics that satisfy the network connectivity requirements of the application, and make that network slice available via the RAN system 204. As such, the core network system 202 may receive that network slice request and, in response, may allocate a network slice having the requested network connectivity requirements, and make that network slice available via the RAN system 204 so that the network slice engine 304 in the endpoint computing device 206a/300 may identify that network slice at block 406.

The method 400 then proceeds to block 408 where the endpoint computing device establishes connections for the detected applications with the respective network slices identified for those applications. In an embodiment, at block 408, the network slice engine 304 in the endpoint computing device 206a/300 may operate to establish a respective connection for each application operating on the endpoint computing device 206a/300 with the network slice that was identified at block 406 as including networking characteristics that satisfy the networking connectivity requirements of that application. For example, at block 408, the network slice engine 304 in the endpoint computing device 206a/300 may, for each application for which it identified a network slice at block 406, present that application as a virtual endpoint computing device in network slice connection communications exchanged with the RAN system 204, with the network slice communications operating to establish a connection between that application and the network slice that was identified for that application at block 406. As will be appreciated by one of skill in the art in possession of the present disclosure, the network slice communications and/or establishment of the connection between the network slice and the application that is presented as a virtual endpoint computing device may be similar to conventional network slice/physical endpoint device communications and/or connection establishment, with the exception of the application being presented as a virtual endpoint computing device in the network slice connection communications and/or connection establishment, and thus are not described herein in detail.

Figure 6C:
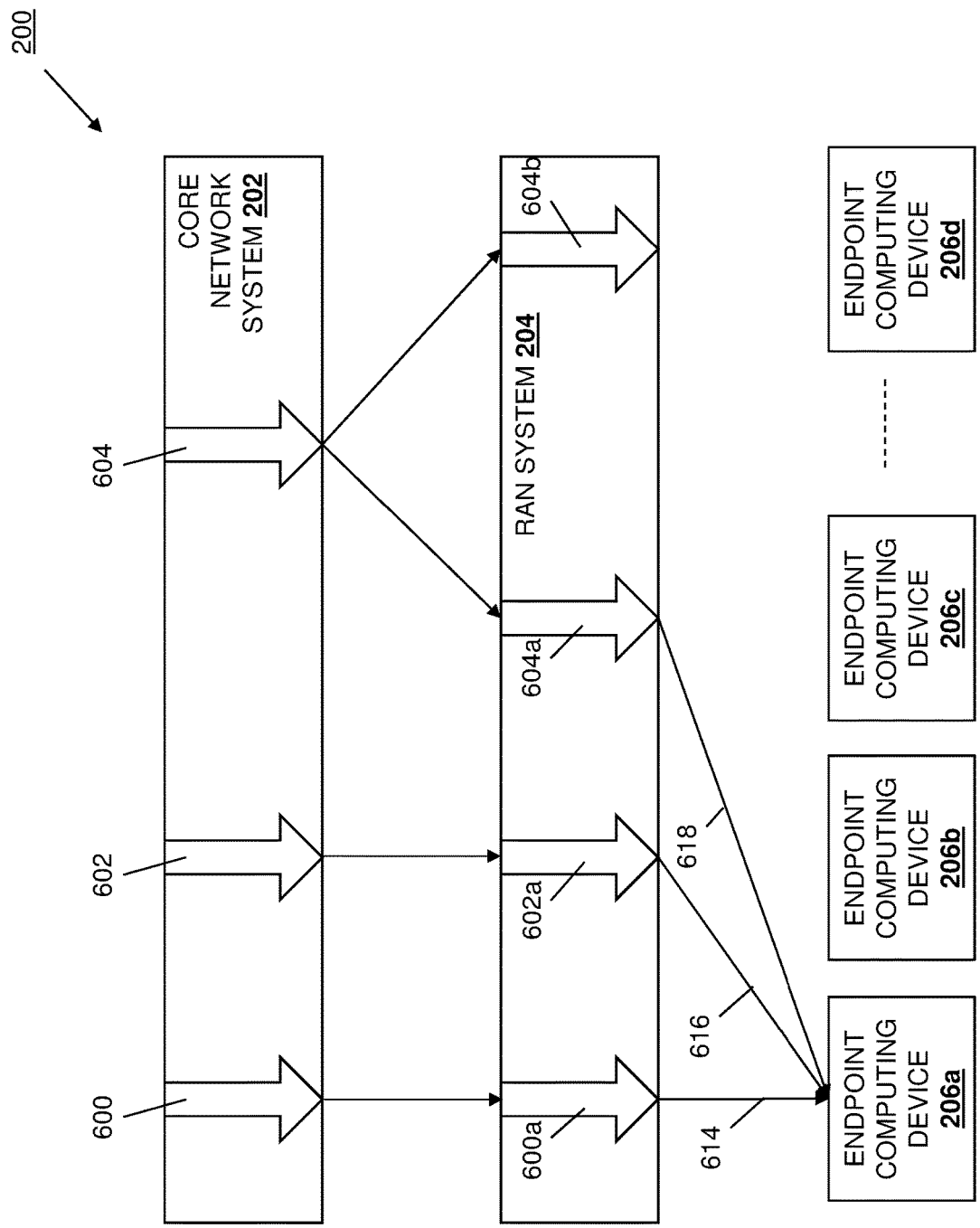
FIG. 6C is a schematic view illustrating an embodiment of the endpoint computing device multi-network slice utilization system of FIG. 2 operating during the method of FIG. 4.

As such, with reference to FIG. 6C, at block 408, the network slice engine 304 in the endpoint computing device 206a/300 may establish a connection 614 for a first application operating on the endpoint computing device 206a with the network slice 600a that was identified as having networking characteristics that satisfy the networking connectivity requirements determined for the first application, establish a connection 616 for a second application operating on the endpoint computing device 206a with the network slice 602a that was identified as having networking characteristics that satisfy the networking connectivity requirements determined for the second application, and establish a connection 618 for a third application operating on the endpoint computing device 206a with the network slice 604a that was identified as having networking characteristics that satisfy the networking connectivity requirements determined for the third application. While not illustrated, as discussed above one of skill in the art in possession of the present disclosure will appreciate that connections with multiple network slices for each application operating on any or all of the endpoint computing devices 206b-206c may be established in a similar manner while remaining within the scope of the present disclosure as well.

Furthermore, in some embodiments, at block 408 the network slice engine 304 in the endpoint computing device 206a/300 may establish connections for respective multiple application subsystems, workload subsystems, and/or functionality subsystems included in an application, workload, or functionality with respective network slices that include respective networking characteristics that satisfy their different networking connectivity requirements (e.g., establishing a first connection with a first network slice including first networking characteristics that satisfy a first networking connectivity requirement for a first application subsystem included in an application operating on the endpoint computing device 206a/300, establishing a second connection with a second network slice including second networking characteristics that satisfy a second networking connectivity requirement for a second application subsystem included in that application operating on the endpoint computing device 206a/300, and so on). Further still, in some embodiments, at block 408 the network slice engine 304 in the endpoint computing device 206a/300 may establish a connection with a network slice that includes networking characteristics that satisfy the same networking connectivity requirement (or a networking connectivity requirement range) for multiple applications that have been grouped in an application container. As such, one of skill in the art in possession of the present disclosure will appreciate that any single endpoint computing device may appear to the RAN system 204 and/or the core network system 202 as many (e.g., tens, hundreds, or more) endpoint computing devices due to the many applications operating on that single endpoint computing device being presented as respective virtual endpoint computing devices.

The method 400 then proceeds to block 410 where the endpoint computing device exchanges communications for the detected applications using the identified network slices. In an embodiment, at block 410, communications may be exchanged between for each application using the connection established with its respective network slice that satisfies its respective networking connectivity requirements. As such, with reference to FIG. 6C, at block 410, the network slice engine 304 in the endpoint computing device 206a/300 may utilize its communication system 308 to exchange communications via the connection 614 with the network slice 600a for the first application operating on the endpoint computing device 206a (e.g., with a device coupled to the RAN system 204, a device coupled to the core network system 202 via a network, etc.), may utilize its communication system 308 to exchange communications via the connection 616 with the network slice 602a for the second application operating on the endpoint computing device 206a (e.g., with a device coupled to the RAN system 204, a device coupled to the core network system 202 via a network, etc.), and may utilize its communication system 308 to exchange communications via the connection 618 with the network slice 602a for the third application operating on the endpoint computing device 206a (e.g., with a device coupled to the RAN system 204, a device coupled to the core network system 202 via a network, etc.) As will be appreciated by one of skill in the art in possession of the present disclosure, the exchange of communications via a connection with a network slice at block 410 may be similar to conventional network slice communication exchanges, with the exception of that multiple applications operating on the endpoint computing device 206a/300 may be exchanging communications via their respective connections with their respective network slices that each include respective networking characteristics that satisfy the networking connectivity requirements of those applications. As discussed below, each of the network slices provided by the core network system 202 are isolated from each other and, as such, any application or workload that is operating on an endpoint computing device and that is utilizing a particular network slice will be unaware of the other networks available via the other network slices being utilized by other applications or workloads operating on that same endpoint computing device.

Furthermore, in some embodiments, at block 408 the network slice engine 304 in the endpoint computing device 206a/300 may operate to exchange communications for respective multiple application subsystems, workload subsystems, and/or functionality subsystems included in an application, workload, or functionality via connections provided with respective network slices (e.g., exchanging communications via a first connection with a first network slice for a first application subsystem included in an application operating on the endpoint computing device 206a/300, exchanging communications via a second connection with a second network slice for a second application subsystem included in that application operating on the endpoint computing device 206a/300, and so on). Further still, in some embodiments, at block 408 the network slice engine 304 in the endpoint computing device 206a/300 may exchange communications via a connection with a network slice for multiple applications that have been grouped in an application container as discussed above.

The method 400 then proceeds to decision block 412 where it is determined whether a detected application is unavailable. In an embodiment, at decision block 412, the network slice engine 304 in the endpoint computing device 206a/300 may operate to determine whether an application for which a respective connection was established with a respective network slice has become unavailable. For example, an application, workload, or other functionality operating on the endpoint computing device may complete, be shut down, and/or may otherwise become unavailable in a manner that does not utilize the network slice with which that application, workload, or other functionality was connected at block 410. As such, the network slice engine 304 in the endpoint computing device 206a/300 may operate to continuously or periodically to monitor applications (or application subsystems in an application, or applications grouped in an application container) for which a connection with a network slice was provided at block 408 to determine whether that application (or application subsystem) has become unavailable or is otherwise not utilizing the network slice to which it was connected. However, while a specific technique for monitoring for the use of a network slice has been described, one of skill in the art in possession of the present disclosure will appreciate that network slice utilization may be determined in a variety of other manners that will fall within the scope of the present disclosure as well.

If, at decision block 412, it is determined that no detected applications are unavailable, the method 400 returns to block 410. As such, in response to determining that each application (or application subsystem in an application, or application grouped in an application container) for which a connection with a network slice was established at block 408 is still utilizing that network slice, the method 400 may loop to continue to exchange communications for applications using the connections to their network slices at block 410, and monitor whether any of those applications have become unavailable at decision block 412. If at decision block 406, it is determined that a detected application is not available, the method 400 proceeds to block 414 where the endpoint computing device ends the connection with the identified network slice for the unavailable detected application. In an embodiment, at block 414 and in response to determining that an application (or application subsystem in an application, or all applications grouped in an application container) is no longer utilizing a connection to a network slice that was provided at block 408, the network slice engine 304 in the endpoint computing device 206a/300 may end that connection with the network slice for that application (or application subsystem in an application, or application container), and release that network slice for use by other applications and/or endpoint computing devices. As will be appreciated by one of skill in the art in possession of the present disclosure, the ending of a connection with a network slice at block 414 may be similar to conventional connection ending operations, and thus is not described herein in detail. The method 400 may then loop to continue to exchange communications for available applications using the connections to their network slices at block 410, monitor whether any of those applications have become unavailable at decision block 412, and end connections to network slices that are no longer being utilized.

In some embodiments, repeated performance of the method 400 may allow the network slice engine 304 in the endpoint computing devices 300 to perform intelligent network slice operations based on learned behavior of the endpoint computing device 300 and/or the applications provided thereon. For example, the network slice engine 304 in the endpoint computing device 300 may monitor the use of applications on the endpoint computing device 300, the time of such application use on the endpoint computing device 300, locations of the endpoint computing device 300, and/or any other information that would be apparent to one of skill in the art in possession of the present disclosure, and may subsequently utilize that information to reserve network slices that include networking characteristics that satisfy the networking connectivity requirements of particular applications. As such, when an endpoint computing device repeatedly operates a particular application at a particular time and in a particular location that utilizes a particular network slice that includes networking characteristics that satisfy its networking connectivity requirements, the network slice engine 304 in the endpoint computing device 300 may learn that behavior and subsequently operate to reserve that network slice at the learned reoccurring application use time for use by the learned application in the learned location. However, while a specific intelligent network slice operation is described, one of skill in the art in possession of the present disclosure will recognize that other intelligent network slice operations may be performed that will fall within the scope of the present disclosure as well.

Thus, systems and methods have been described that provide for the utilization of respective network slices for different functionality (e.g., different applications, different workloads, etc.) provided on any particular endpoint computing device. For example, a 5G core network system that is coupled to a 5G RAN system may allocate a plurality of network slices and make each of the plurality of network slices available for use in wireless communications via the 5G RAN system. An endpoint computing device may include first and second applications that are configured to operate on the endpoint computing device, and the endpoint computing device may detect each of the first application and the second application, determine a first networking connectivity requirement for the first application, and determine a second networking connectivity requirement for the second application. The endpoint computing device may then identify a first network slice that is allocated by the 5G core network system, available via the 5G RAN system, and that includes networking characteristics that satisfy the first networking connectivity requirements for the first application. The endpoint computing device may also identify a second network slice that is allocated by the 5G core network system, available via the 5G RAN system, and that includes networking characteristics that satisfy the second networking connectivity requirements for the second application. The endpoint computing device then establishes a first connection for the first application with the first network slice, and establishes a second connection for the second application with the second network slice. Subsequently, the first application may exchange first communications via the 5G RAN system and the 5G core network system using the first network slice, and the second application may exchange second communications via the 5G RAN system and the 5G core network system using the second network slice. As such, network slicing is extended to general purpose endpoint computing devices running applications (or workloads) with different networking connectivity requirements by connecting each of those applications (or workloads) to a respective network slice with networking characteristics that satisfy its networking connectivity requirements, thus optimizing the networking connectivity of the general purpose endpoint computing device on a per-application/per-workload/per functionality basis.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An endpoint computing device multi-network slice utilization system, comprising:
    a network system that is configured to allocate a plurality of network slices and make each of the plurality of network slices available for use; and
    an endpoint computing device that is configured, for each of a plurality of different functionality provided by the endpoint computing device, to:
        identify that functionality;
        determine a networking connectivity requirement for that functionality;
        identify one of the plurality of network slices that is allocated by the network system and that satisfies the networking connectivity requirement for that functionality;
        establish a connection for that functionality with the one of the plurality of network slices that satisfies the networking connectivity requirement for that functionality; and
        exchange communications via the network system for that functionality using the one of the plurality of network slices that satisfies the networking connectivity requirement for that functionality.

2. The system of claim 1, wherein the endpoint computing device is configured, for at least one of the plurality of different functionality, to:
    request the one of the plurality of network slices that satisfies the networking connectivity requirement for that at least one of the plurality of different functionality, and wherein the network system is configured to allocate the one of the plurality of network slices that satisfies the networking connectivity requirement for that at least one of the plurality of different functionality in response to the request, and make the one of the plurality of network slices that satisfies the networking connectivity requirement for that at least one of the plurality of different functionality available for use.

3. The system of claim 1, wherein the endpoint computing device is configured, for each of the plurality of different functionality, to:
    determine that functionality is no longer provided and, in response, end the connection for that functionality with the one of the plurality of network slices that satisfies the networking connectivity requirement for that functionality.

4. The system of claim 1, wherein the endpoint computing device is configured, for each of the plurality of different functionality, to:

present that functionality as a virtual endpoint computing device when establishing the connection for that functionality with the one of the plurality of network slices that satisfies the networking connectivity requirement for that functionality.

5. The system of claim 1, wherein the endpoint computing device is configured, for at least two of the plurality of different functionality, to:
identify one of the plurality of network slices that is allocated by the network system and that satisfies a container networking connectivity requirement for a container that includes at least one functionality subsystem that provides those at least two of the plurality of different functionality;
establish a container connection for the container that includes the at least one functionality subsystem that provides those at least two of the plurality of different functionality with the one of the plurality of network slices that satisfies the container networking connectivity requirement for the container; and
exchange communications via the network system for the at least one functionality subsystem that provides those at least two of the plurality of different functionality using the one of the plurality of network slices that satisfies the container networking connectivity requirement for the container.

6. The system of claim 1, wherein each of the plurality of network slices includes a portion of a wireless communication spectrum that is available to the network system.

7. An Information Handling System (IHS), comprising:
a processing system; and
a memory system that is coupled to the processing system and that includes instructions that, when executed by the processing system, cause the processing system to provide a network slice engine that is configured, for each of a plurality of different functionality, to:
identify that functionality;
determine a networking connectivity requirement for that functionality;
identify one of a plurality of network slices that is allocated by a network system and that satisfies the networking connectivity requirement for that functionality;
establish a connection for that functionality with the one of the plurality of network slices that satisfies the networking connectivity requirement for that functionality; and
exchange communications via the network system for that functionality using the one of the plurality of network slices that satisfies the networking connectivity requirement for that functionality.

8. The IHS of claim 7, wherein network slice engine is configured, for at least one of the plurality of different functionality, to:
request the one of the plurality of network slices that satisfies the networking connectivity requirement for that at least one of the plurality of different functionality, and wherein the network system allocates the one of the plurality of network slices that satisfies the networking connectivity requirement for that at least one of the plurality of different functionality in response to the request, and makes the one of the plurality of network slices that satisfies the networking connectivity requirement for that at least one of the plurality of applications available for use.

9. The IHS of claim 7, wherein network slice engine is configured, for at least one of the plurality of different functionality, to:
determine that functionality is no longer provided and, in response, end the connection for that functionality with the one of the plurality of network slices that satisfies the networking connectivity requirement for that functionality.

10. The IHS of claim 7, wherein network slice engine is configured, for at least one of the plurality of different functionality, to:
present that functionality as a virtual endpoint computing device when establishing the connection for that functionality with the one of the plurality of network slices that satisfies the networking connectivity requirement for that functionality.

11. The IHS of claim 7, wherein network slice engine is configured, for at least two of the plurality of different functionality, to:
identify one of the plurality of network slices that is allocated by the network system and that satisfies a container networking connectivity requirement for a container that includes at least one functionality subsystem that provides those at least two of the plurality of different functionality;
establish a container connection for the container that includes the at least one functionality subsystem that provides those at least two of the plurality of different functionality with the one of the plurality of network slices that satisfies the container networking connectivity requirement for the container; and
exchange communications via the network system for the at least one functionality subsystem that provides those at least two of the plurality of different functionality using the one of the plurality of network slices that satisfies the container networking connectivity requirement for the container.

12. The IHS of claim 7, wherein each of the plurality of network slices includes a portion of a wireless communication spectrum that is available to the network system.

13. The IHS of claim 7, wherein at least one of the plurality of different functionality provides a workload having the networking connectivity requirement for that functionality.

14. A method for utilizing multiple network slices by an endpoint computing device, comprising:
identifying, by an endpoint computing device, each of a first functionality and a second functionality provided by the endpoint computing device;
determining, by the endpoint computing device, a first networking connectivity requirement for the first functionality and a second networking connectivity requirement for the second functionality;
identifying, by the endpoint computing device, a first network slice that is allocated by a network system and that satisfies the first networking connectivity requirement for the first functionality;
identifying, by the endpoint computing device, a second network slice that is allocated by the network system and that satisfies the second networking connectivity requirement for the second functionality;
establishing, by the endpoint computing device, a first connection for the first functionality with the first network slice, and a second connection for the second functionality with the second network slice; and
exchanging, by the endpoint computing device, first communications via the network system for the first functionality using the first network slice, and second communications via the network system for the second functionality using the second network slice.

15. The method of claim 14, further comprising:
requesting, by the endpoint computing device, the first network slice that satisfies the first networking connectivity requirement for the first functionality, wherein the network system allocates the first network slice in response to the request, and makes the first network slice available for use.

16. The method of claim 14, further comprising:
determining, by the endpoint computing device, that the first functionality is no longer provided and, in response, ending the connection for the first functionality with the first network slice.

17. The method of claim 14, further comprising:
presenting, by the endpoint computing device, the first functionality as a first virtual endpoint computing device when establishing the first connection for the first functionality with the first network slice; and
presenting, by the endpoint computing device, the second functionality as a second virtual endpoint computing device when establishing the second connection for the second functionality with the second network slice.

18. The method of claim 14, further comprising:
identifying, by the endpoint computing device, the first network slice that is allocated by the network system and that satisfies a container networking connectivity requirement for a container that includes at least one functionality subsystem that provides the first functionality and at least one third functionality;
establishing, by the endpoint computing device, a container connection for the container that includes the at least one functionality subsystem that provides the first functionality and at least one third functionality with the first network slice that satisfies the container networking connectivity requirement for the container; and
exchanging communications via the network system for the first functionality and at least one third functionality using the first network slice that satisfies the container networking connectivity requirement for the container.

19. The method of claim 14, wherein the first network slice includes a first portion of a wireless communication spectrum that is available to the network system, and the second network slice includes a second portion of the wireless communication spectrum that is available to the network system.

20. The method of claim 14, wherein the first functionality provides a workload having the networking connectivity requirement for the first functionality.

* * * * *